United States Patent

Nakamura et al.

[11] Patent Number: 5,963,701
[45] Date of Patent: Oct. 5, 1999

[54] PLASTIC OPTICAL FIBERS AND OPTICAL FIBER CABLES

[75] Inventors: Kazuki Nakamura; Jun Okumura; Kikue Irie; Makoto Muro; Jun Kamo, all of Otake; Katsuhiko Shimada, Toyama, all of Japan

[73] Assignee: Mitsubishi Rayon Co., Ltd., Tokyo, Japan

[21] Appl. No.: 08/945,886

[22] PCT Filed: May 15, 1996

[86] PCT No.: PCT/JP96/01270

§ 371 Date: Nov. 14, 1997

§ 102(e) Date: Nov. 14, 1997

[87] PCT Pub. No.: WO96/36894

PCT Pub. Date: Nov. 21, 1996

[30] Foreign Application Priority Data

May 15, 1995 [JP] Japan .................................. 7-116174
Jul. 14, 1995 [JP] Japan .................................. 7-179240

[51] Int. Cl.$^6$ ................................................ G02B 6/00
[52] U.S. Cl. .................... 385/143; 385/145; 385/128; 385/102; 428/394; 428/375
[58] Field of Search .................................. 428/375, 392, 428/394, 373; 385/143, 145, 141, 127, 128, 102, 100

[56] References Cited

U.S. PATENT DOCUMENTS

| | | | |
|---|---|---|---|
| 4,138,194 | 2/1979 | Beasley et al. ........................ | 350/96.3 |
| 4,544,235 | 10/1985 | Nishida et al. ....................... | 350/96.34 |
| 4,566,755 | 1/1986 | Ohmori et al. ....................... | 350/96.34 |
| 4,762,392 | 8/1988 | Yamamoto et al. ................... | 350/96.3 |
| 4,798,445 | 1/1989 | Yamamoto et al. ................... | 350/96.34 |
| 4,804,259 | 2/1989 | Sasaki et al. ......................... | 350/96.34 |
| 4,889,408 | 12/1989 | Teshima et al. ...................... | 350/96.34 |
| 5,148,511 | 9/1992 | Savu et al. ............................ | 385/145 |

FOREIGN PATENT DOCUMENTS

| | | |
|---|---|---|
| 0 331 056 | 9/1989 | European Pat. Off. . |
| 0 802 432 | 10/1997 | European Pat. Off. . |

OTHER PUBLICATIONS

R. J. S. Bates, et al., Proceedings Of The European Conference On Optical Communication, vol. 1, No. Conf. 18, pp. 297 to 300, A 265 Mbit/s, 100 M Plastic Optical Fibre Data Link Using a 265 NM Laser Transmitter for Customer Premises Network Applications, Sep. 27, 1992.

*Primary Examiner*—Hung N. Ngo
*Attorney, Agent, or Firm*—Oblon, Spivak, McClelland, Maier & Neustadt, P.C.

[57] ABSTRACT

This invention relates to a plastic optical fiber having a three-layer structure comprising a core, a cladding and a protective layer wherein the core material is polymethyl methacrylate and the cladding material is a copolymer composed of 20 to 45% by weight of long-chain fluoroalkyl methacrylate units represented by the following formula (1), 54 to 79% by weight of methyl methacrylate units, and 0.05 to 2% by weight of methacrylic acid units. This invention also relates to a plastic optical fiber cable having a four-layer structure wherein the optical fiber cable is produced by covering the aforesaid optical fiber with a jacket layer.

$$CH_2=C(CH_3)-COO-(CH_2)_2(CF_2)_7CF_3 \quad (1)$$

11 Claims, 2 Drawing Sheets

PLASTIC OPTICAL FIBERS AND OPTICAL FIBER CABLES

TECHNICAL FIELD

This invention relates to wide-bandwidth step index type plastic optical fibers (hereinafter referred to as "SI type POF") and optical fiber cables which can be used as optical information communication media.

BACKGROUND ART

Optical transmission is widely used as a communication means because of its characteristic feature that it has a large capacity and it is entirely insusceptible to the influenced of electromagnetic noises. Optical fibers which are now being practically use as light transmission media can be classified into quartz optical fibers and plastic optical fibers (hereinafter referred to as "POFs").

POFs have the following advantages: (1) They are flexible and easily handleable in spite of their large diameter. (2) When coupled to other POFs and light-emitting devices, they have such great latitude in positioning that they can be easily connected without expensive equipment. (3) No optical system is required for connecting purposes.

Owing to these advantages, the application of POFs to short-distance communication means (e.g., data links), sensors and the like is spreading. Moreover, it is expected for the future that they will be applied to low-cost short-distance information transmission lines having many junction points, including terminal wirings in station networks and subscriber networks (FTTHs) such as LANs among FA and OA equipment located on the inside and outside of the floor. Furthermore, POFs have such excellent flexibility that they are scarcely subject to failure, breakage or deterioration even in a vibratory Ienvironment and are also superior to quartz optical fibers in this respect. Accordingly, attempts are being made to apply POFs to signal communication lines including, for example, networks in vehicles such as automobiles, electric cars and airplanes.

Meanwhile, there is a yearly increasing demand for an improvement in transmission speed in these communication applications. When bandwidth is used as an index indicating the quantity of data which can be transmitted through a POF in a unit time, the bandwidths of POFs heretofore in practical use have usually been at most 5–6 MHz·km (−3 dB). At this bandwidth, the practical communication rate at a fiber length of 100 m is 100 Mbps (bits per second) or less, even if an optimized LED module is used. Thus, this bandwidth is too narrow for applications such as medium-speed and high-speed LANs.

There have been proposed various SI type POFs using polymethyl methacrylate (PMMA) as the core material and a fluorine-containing polymer as the cladding material.

Japanese Patent Laid-Open No. 36111/'84 discloses a cladding material comprising a copolymer composed of a long-chain fluoroalkyl methacrylate, methacrylic acid and methyl methacrylate. However, this cladding material contains not less than 65% of the long-chain fluoroalkyl methacrylate, and the content of methyl methacrylate is not greater than 29%. Consequently, the refractive index of the cladding material is not greater than 1.420 and the numerical aperture of the resulting optical fiber is not less than 0.45. This reference includes no suggestion on a POF having wide bandwidth characteristics.

Moreover, Japanese Patent Laid-Open No. 66706/'86 discloses a cladding material comprising a copolymer composed of a long-chain fluoroalkyl methacrylate, a short-chain fluoroalkyl methacrylate and methyl methacrylate. However, the content of methyl methacrylate in this cladding material is not greater than 50%, and this reference includes no suggestion on a POF having wide bandwidth characteristics.

Recently, it has been proposed in Conference Proceedings of 3rd International Conference on Plastic Optical Fibers & Applications, pages 148–151 and 147 that wide bandwidth characteristics can be imparted to an SI type POF by reducing the numerical aperture of the fiber.

Furthermore, Japanese Patent Laid-Open No. 239420/'95, which was laid open to the public after the filing of Japanese Patent Application No. 116174/'95 underlying the present application for the declaration of priority, discloses a POF using PMMA as the core material and a copolymer composed of a specific fluoroalkyl methacrylate and MMA as the cladding material. This reference shows the facts that a wide bandwidth can be achieved by making the refractive indices of the core material and the cladding material close to each other and that the thermal resistance of the POF can be improved by using a specific fluoromethacrylate copolymer as the cladding material. However, this POF contains a short-chain fluoromethacrylate in the cladding material and hence has unsatisfactory mechanical properties.

On the other hand, POFs having a three-layer structure comprising a core, a cladding and a protective layer have conventionally been proposed. Japanese Patent Laid-Open No. 204209/'87 discloses a POF in which two layers of a cladding material consisting of a fluorine-containing resin are disposed on a core material consisting essentially of PMMA. In this patent, it is intended to improve the thermal resistance of the POF by using two cladding layers and, moreover, improve the flexing resistance of the POF by reducing the thickness of the first cladding layer to as small as 3–4 $\mu$m. However, this POF also contains a short-chain fluoromethacrylate (such as pentafluoropropyl methacrylate or tetrafluoropropyl methacrylate) in the cladding material and hence has unsatisfactory mechanical properties. Moreover, this reference disclosed no design concept concerning an SI type POF having wide bandwidth characteristics.

Japanese Patent Laid-Open No. 249325/'93 discloses a POF comprising a core material consisting essentially of PMMA and a cladding material consisting of a specific fluororesin. This reference proposes the idea that two cladding layers may be used to prevent the plasticizer contained in the jacket material from diffusing into the core and the cladding and also to reduce the transmission loss of the POF and to prevent the deterioration of mechanical properties. However, the refractive index of this cladding material is not greater than 1.409 and, therefore, the numerical aperture of the resulting optical fiber is not less than 0.48. Thus, this reference also includes no suggestion on a POF having wide bandwidth characteristics.

As described above, a POF having a reduced numerical aperture serves as a means for obtaining an SI type POF having wide bandwidth characteristics. However, a reduction in the numerical aperture of a POF raises the following problems: (1) The amount of light released from the side surface of the fiber to the outside is increased when the fiber is bend, resulting in an increase in light transmission loss; and (2) the coupling loss between the POF and the light source is increased. Moreover, it is also important to secure practical mechanical strength of the POF.

DISCLOSURE OF THE INVENTION

An object of the present invention is to provide an SI type POF and an SI type POF cable which have a combination of practical light transmission loss properties, wide bandwidth characteristics and high mechanical strength.

According to the present invention, there is provided a plastic optical fiber having a three-layer structure comprising a core, a cladding and a protective layer wherein the core material is polymethyl methacrylate and the cladding material is a copolymer composed of 20 to 45% by weight of long-chain fluoroalkyl methacrylate units represented by the following formula (1), 54 to 79% by weight of methyl methacrylate units, and 0.05 to 2% by weight of methacrylic acid units.

$$CH_2=C(CH_3)-COO-(CH_2)_2(CF_2)_7CF_3 \quad (1)$$

According to the present invention, there is also provided a plastic optical fiber cable having a four-layer structure comprising a core, a cladding, a protective layer and a jacket layer wherein the optical fiber cable is produced by covering the aforesaid optical fiber with a jacket layer.

BRIEF DESCRIPTION OF THE DRAWINGS

In FIG. 1, reference numerals 1, 2 and 3 designate a POF cable, an LED and a photodetector, respectively.

BEST MODE FOR CARRYING OUT THE INVENTION

Figure 1:
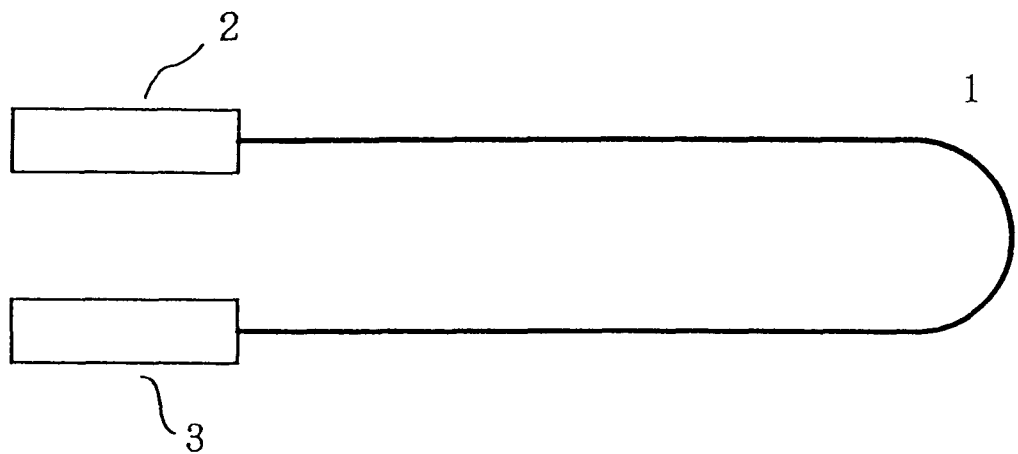
FIG. 1 is a schematic view showing the manner in which a POF cable is bend in order to measure its transmission loss upon bending under 20 mm R/180° conditions.

In the present invention, polymethyl methacrylate is used as the core material of the POF from the viewpoint of optical properties, mechanical strength, reliability and the like. Copolymers containing a minor amount of butyl methacrylate, ethyl methacrylate and/or maleimide compounds which are copolymerizable with methyl methacrylate may also be used.

Examples of the cladding material used for the POF of the present invention include fluorine-containing methacrylate (co)polymers, fluorine-containing methacrylate-methacrylic ester (co)polymers, α-fluoromethacrylate (co)polymers and mixtures thereof.

In order to impart a numerical aperture of 0.24 to 0.40 to the POF, the cladding material should have a refractive index of 1.435 to 1.47. If the numerical aperture of the fiber is too small, an increase in light transmission loss will be caused when the fiber is bent, and an increase in coupling loss will also be caused. Accordingly, the numerical aperture must be not less than 0.24 and preferably not less than 0.27. In order to secure a bandwidth of 80 MHz at a fiber length of 100 m, the numerical aperture must be not greater than 0.40. In order to secure a bandwidth of 90 MHz or greater, a numerical aperture of not greater than 0.34 is preferred. Consequently, the cladding material should preferably have a refractive index of 1.45 to 1.465.

Accordingly, a cladding material having a composition comprising a combination of monomers which provide a refractive index in the range of 1.435 to 1.47 is chosen. One example thereof is a copolymer composed of a long-chain fluoroalkyl methacrylate of formula (1), methyl methacrylate and methacrylic acid. This copolymer has a well-balanced combinations of properties such as mechanical properties, transparency and resistance to thermal decomposition.

$$CH_2=C(CH_3)-COO-(CH_2)_2(CF_2)_7CF_3 \quad (1)$$

If the content of the long-chain fluoroalkyl methacrylate is less than 20% by weight, the cladding material will have a refractive index greater than 1.467 and hence give an unduly small numerical aperture. If the content of the long-chain fluoroalkyl methacrylate is greater than 45% by weight, the cladding material will exhibit crystallinity and hence cause an increase in light transmission loss due to light scattering in the cladding material.

It is particularly preferable that the content of long-chain fluoroalkyl methacrylate units in the cladding material be in the range of 23 to 35% by weight. The content of methyl methacrylate units in the cladding material is determined so as to give a refractive index in the desired range. The content of methyl methacrylate units is preferably in the range of 54 to 79% by weight and more preferably in the range of 63 to 75% by weight.

Methacrylic acid is required in order to improve the resistance to thermal decomposition of the cladding material and, moreover, improve its adhesion to the core material. The content of methacrylic acid is preferably not less than 0.05% by weight. With consideration for processability, it is preferably not greater than 2% by weight. More preferably, the content of methacrylic acid is in the range of 0.5 to 2% by weight.

No particular limitation is placed on the thickness of the cladding material. However, since an unduly thin cladding material causes an increase in light transmission loss, its thickness is preferably not less than 5 μm. Examination according to the FFP method which will be described later has revealed that, if the cladding material has a thickness of 8 μm or greater, the POF will show a marked improvement in light transmission bandwidth.

In the POF of the present invention, a protective layer is disposed on the outside of the cladding. This protective layer permits the effective utilization of light received by the cladding of the POF and serves to improve the coupling efficiency between the light source and the POF. Moreover, the protective layer also serves to direct part of the light leaking from the core into the cladding back to the core. Specifically, when the POF is bent, the amount of light released from the core of a bent POF to the outside is much greater when the POF has a smaller numerical aperture than when the POF has a larger numerical aperture. Accordingly, the protective layer effectively functions to prevent POFs having a small numerical aperture from suffering an increased light transmission loss.

As the material of the protective layer, a material having a lower refractive index than the cladding material is preferably used with a view to preventing the light propagated through the fiber from escaping through the side surface thereof. One example of such a material is a copolymer composed of 70 to 90 mole % of vinylidene fluoride and 30 to 10 mole % of tetrafluoroethylene. This copolymer is a preferred material because it also has excellent mechanical properties and chemical resistance.

Moreover, this copolymer has the lowest melting point when its vinylidene fluoride content is 80 mole %.

Consequently, the copolymer having this composition, together with PMMA used as the core material, may readily be subjected to multilayer spinning and subsequent drawing operation. This drawing operation is carried out for the purpose of improving the mechanical strength of the POF.

No particular limitation is placed on the thickness of the protective layer. However, it is determined by a trade-off between economic efficiency and fiber performance. In order to exhibit satisfactorily good mechanical properties and chemical resistance, the protective layer should preferably have a thickness of not less than 5 µm.

The combined use of the aforesaid cladding material and the material of this protective layer brings about a marked improvement in the transmission bandwidth of the POF or POF cable and, moreover, suppresses an increase in transmission loss when it is bent.

When light is propagated through a POF, the magnitude of the bandwidth thereof is affected by higher-order mode light having a low propagation velocity. In order to impart a wide bandwidth to a POF, it is necessary to reduce the amount of this higher-order mode light. The present inventors have achieved a reduction in the amount of higher-order mode light by decreasing the numerical aperture of the POF and choosing a proper fiber structure.

Preferred POFs and the POF cables are such that, when the exit FFP of light emitted from a fiber after 100 m propagation is measured under full-mode launch conditions, the ratio (R) of the value (Sp) obtained by integrating the FFP over an exit angle range of −20° to +20° to the value (S) obtained by integrating the FFP over the full angle range is not less than 98%.

The term "FFP" refers to the distribution of the amount of light emitted from a POF as a function of exit angle when viewed from a sufficiently distant position where the light-emitting end face of the POF can be regarded as a point. Since the order of the mode of propagated light is proportional to the propagation angle, the FFP indicates the mode distribution of light propagated through the POF.

The POF of the present invention may be produced, for example, by (1) a continuous bulk polymerization-direct spinning process in which the steps of polymerizing MMA, removing volatile components from the polymerization system, and spinning PMMA are carried out continuously and in which the PMMA used as the core material is coextruded together with a cladding material and a protective material that are separately supplied from other screw type extruding machines or the like (composite spinning); or (2) a process in which PMMA (core material), a cladding material and a protective material that are separately supplied from screw type extruding machines or the like are coextruded. Of these processes, the process (1) is preferably employed in order to reduce the transmission loss of the POF to the fullest extent.

The material of the jacket layer of the POF cable is chosen with consideration for mechanical properties, thermal resistance and flame retardancy. For this purpose, polyethylene, polyvinyl chloride, chlorinated polyethylene and polyolefin elastomers may be used.

The POF cable of the present invention exhibits a transmission loss increment of not greater than 1 dB upon bending under 20 mm R/180° conditions, and a number of flexings to break of not less than 10,000 upon repeated flexing under 15 mm R/±90° conditions.

Figure 2:
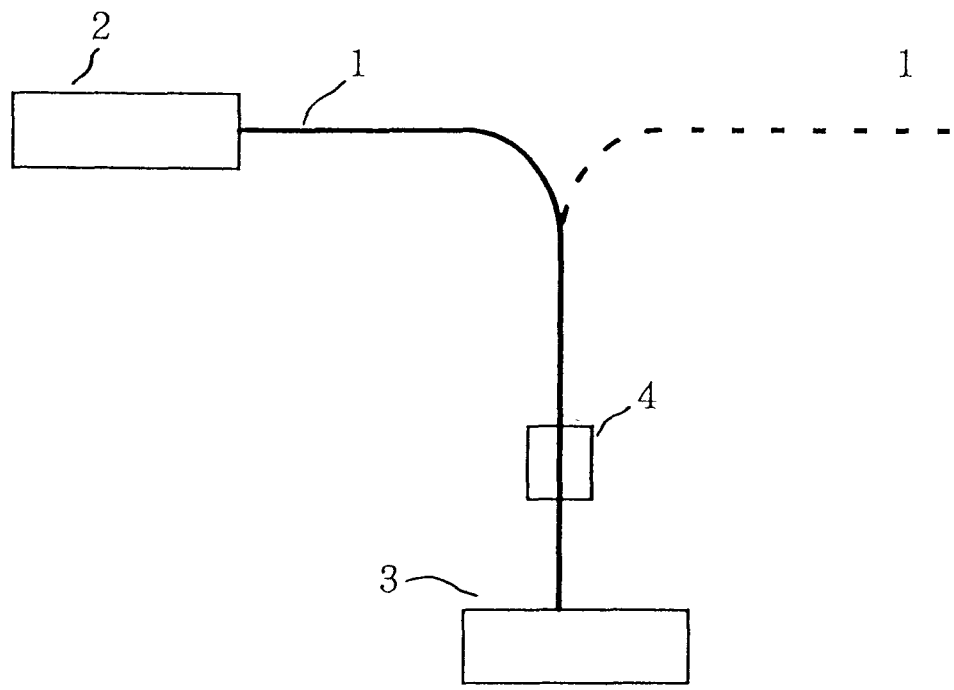
FIG. 2 is a schematic view showing the manner in which a POF cable is repeatedly flexed under 15 mm R/±90° conditions.

As used herein, the expression "transmission loss increment upon bending under 20 mm R/180° conditions" refers to the transmission loss increment determined by comparing the transmission loss measured in such a state that an intermediate part of a cable is bent with a radius of curvature of 20 mm as shown in FIG. 1, with the transmission loss measured in a normal state. The expression "number of flexings to break upon repeated flexing under 15 mm R/±90° conditions" refers to, when a cable is interposed between tubular or cylindrical bodies having a radius of curvature of 15 mm and repeatedly flexed by 90° leftward and rightward (i.e., by a total of 180°) as shown in FIG. 2, the number of flexings at which the transmission loss has increases abruptly and, therefore, the cable is judged to have been substantially broken. In each example, the number of flexings to break was measured with a load of 500 g applied to the cable as shown in FIG. 2.

The present invention is more specifically described with reference to the following examples. Other characteristic values of POFs and POF cables were measured according to the procedures 1) to 6) given below.

1) Numerical aperture (NA): This was measured according to the reflection method of JIS C6862.

2) Transmission bandwidth under full-mode launch conditions: Using a 102 m minus 2 m cut-back technique, the −3 dB bandwidth at a launch NA of 0.65 and a fiber length of 100 m was measured according to the impulse response method. For this purpose, an optical sampling oscilloscope (manufactured by Hamamatsu Photonics Co., Ltd.) was used as the measuring apparatus, and a Semiconductor Laser TOLD 9410 (manufactured by Toshiba Corp.) having an emission wavelength of 650 nm was used as the light source.

3) Transmission loss: Light from a light source was monochromatized to a wavelength of 650 nm with a spectrometer, and the launch NA was adjusted to 0.1 with the aid of a lens. Then, transmission loss was measured using a 25 m minus 5 m cut-back technique.

4) Refractive index: The nD value at a temperature of 20° C. was measured with an Abbe refractometer.

Figure 3:
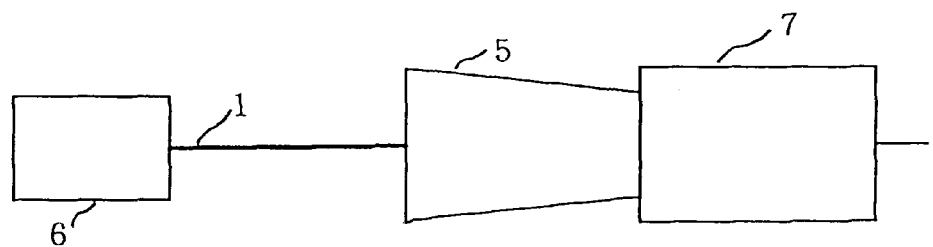
FIG. 3 is a schematic view showing an FFP measuring system. Reference numerals 5, 6 and 7 designate a Fourier transform optical system, an LD and a CCD element, respectively.

5) Exit FFP (far field pattern): Using a light source (Semiconductor Laser TOLD 9410 having an emission wavelength of 650 nm; manufactured by Toshiba Corp.) adjusted to a launch NA of 0.65, the FFP of light emitted from a fiber after 100 m propagation was measured with a Fourier transform optical system shown in FIG. 3.

6) Coupling loss increment: An LED (TLRA 280; manufactured by Toshiba Corporation) was used as a light source. This light source was connected to one end of a POF or POF cable having a length of 1 m and the amount ($I_o$) of light emitted from the other end thereof was measured. The amount of light emitted when a reference fiber (i.e., the fiber of Comparative Example 1) was used as the POF (or POF cable) is designated by $I_o$ and the amount of light emitted when a POF (or POF cable) to be evaluated was used as the POF (or POF cable) is designated by I. Then, the coupling loss increment (in dB) can be calculated according to the following equation.

$$\text{Coupling loss increment} = 10 \times \log_{10}(I_o/I)$$

EXAMPLE 1

Polymethyl methacrylate was used as the core material, and a copolymer composed of 25% by weight of a long-chain fluoroalkyl methacrylate of formula (1), 74% by weight of methyl methacrylate, and 1% by weight of methacrylic acid was used as the cladding material. The refractive index of this copolymer was 1.463. Using a copolymer composed of 80 mole % of vinylidene fluoride and 20 mole % of tetrafluoroethylene (VP-50; manufactured by Daikin Industries, Ltd.) for a protective layer, three-layer composite spinning was carried out according to a continuous bulk polymerization-direct spinning process. Thus, there was obtained a three-layer POF comprising a core, a cladding and a protective layer and having a fiber diameter of 1,000 μm and a cladding thickness of 5 μm.

The results of evaluation of this POF are shown in Table 1.

EXAMPLE 2

The POF obtained in Example 1 was covered with polyethylene to produce a POF cable having an outer diameter of 2.2 mm. The results of evaluation of this POF cable are shown in Table 1.

EXAMPLE 3

A three-layer POF having a fiber diameter of 1,000 μm and a cladding thickness of 5 μm was obtained by carrying out three-layer composite spinning in the same manner as in Example 1, except that a copolymer composed of 30% by weight of a long-chain fluoroalkyl methacrylate of formula (1), 69% by weight of methyl methacrylate, and 1% by weight of methacrylic acid was used as the cladding material. The refractive index of the cladding material was 1.455. The results of evaluation of this POF are shown in Table 1.

EXAMPLE 4

A POF was obtained in the same manner as in Example 1, except that the cladding had a thickness of 10 μm. The results of evaluation of this POF are shown in Table 1.

EXAMPLE 5

A POF was obtained in the same manner as in Example 3, except that the cladding had a thickness of 10 μm. The results of evaluation of this POF are shown in Table 1.

EXAMPLE 6

A copolymer composed of 25% by weight of a long-chain fluoroalkyl methacrylate of formula (1), 73.1% by weight of methyl methacrylate, and 1.9% by weight of methacrylic acid was prepared for use as the cladding material. A POF cable was obtained in the same manner as in Example 2, except that the above copolymer was used as the cladding material. The results of evaluation of this POF cable are shown in Table 1.

EXAMPLES 7 to 9

The POFs of Examples 3, 4 and 5 were covered with polyethylene to produce POF cables having an outer diameter of 2.2 mm. The results of evaluation of these POF cables are shown in Table 1.

In Examples 7, 8 and 9, the POFs of Examples 3, 4 and 5 were used respectively.

EXAMPLE 10

Figure 4:
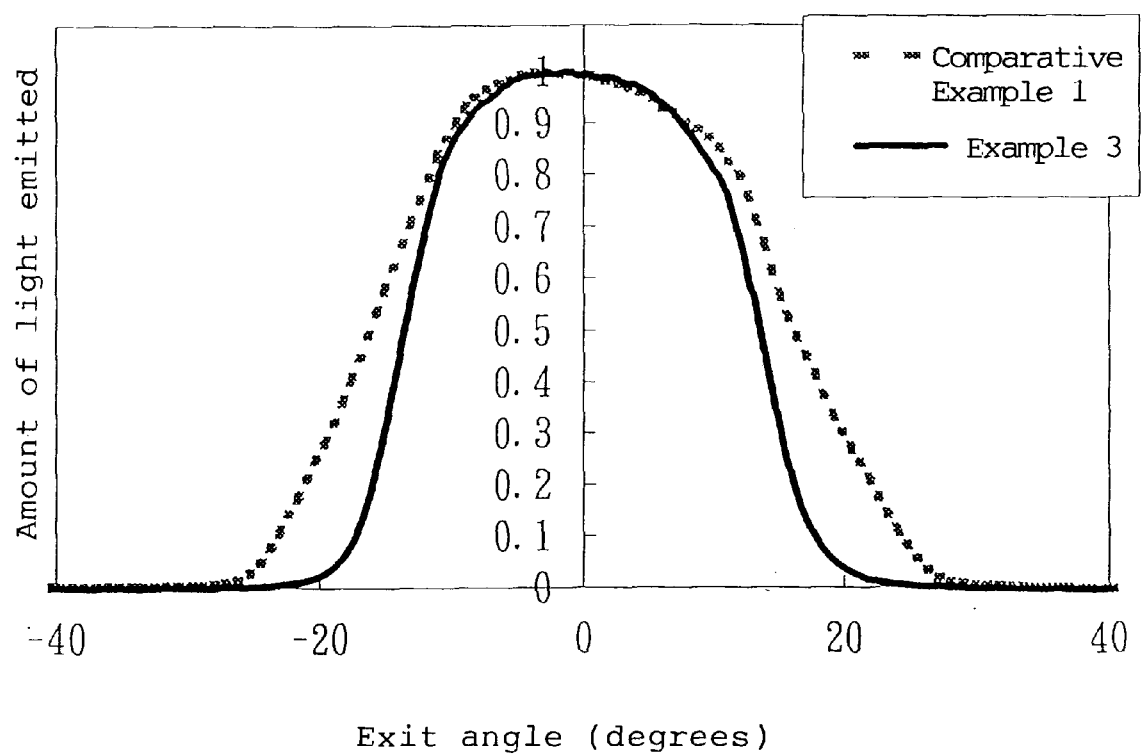
FIG. 4 is a diagram showing the results of FFP measurements in Example 7. The ordinate indicates the relative amount of light emitted from a fiber with the maximum value taken at 1.0, while the abscissa indicates the exit angle of light emitted from the light emitting end of the fiber.

The exit FFP of the POF cable of Example 7 was measured, and the result thus obtained is shown in FIG. 4. The ratio R (=Sp/S) was 98%.

COMPARATIVE EXAMPLE 1

In Example 1, a copolymer composed of 50% by weight of a long-chain fluoroalkyl methacrylate of formula (1), 30% by weight of a short-chain fluoroalkyl methacrylate of formula (2), 18% by weight of methyl methacrylate, and 2% by weight of methacrylic acid was used as the cladding material. Excepting this, a POF cable was obtained in the same manner as in Example 2. The refractive index of the cladding material was 1.405.

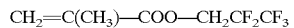

$$CH_2=C(CH_3)-COO-CH_2CF_2CF_3 \quad (2)$$

The results of evaluation of this POF cable are shown in Table 1. The exit FFP of this POF cable is shown in FIG. 4. The ratio R (=SP/S) was 94%.

COMPARATIVE EXAMPLE 2

A three-layer POF cable was obtained in the same manner as in Example 1, except that the protective layer was omitted. The results of evaluation of this POF cable are shown in Table 1.

TABLE 1

|  | Numerical aperture | Transmission loss (dB/km) | −3 dB bandwidth (MHz) | Transmission loss increment upon bending (dB) | Number of flexings to break (times) | Coupling loss increment (dB) |
| --- | --- | --- | --- | --- | --- | --- |
| Example 1 | 0.282 | 130 | 150 | — | — | — |
| Example 2 | 0.282 | 132 | 180 | 0.25 | 20,000 or more | 0.2 |
| Example 3 | 0.321 | 132 | 140 | — | — | — |
| Example 4 | 0.282 | 130 | 170 | — | — | — |
| Example 5 | 0.321 | 127 | 160 | — | — | — |
| Example 6 | 0.322 | 128 | 140 | 0.23 | 20,000 or more | 0.1 |
| Example 7 | 0.321 | 132 | 140 | 0.3 | 20,000 or more | 0.1 |
| Example 8 | 0.282 | 133 | 170 | 0.3 | 20,000 or more | 0.2 |
| Example 9 | 0.321 | 130 | 160 | 0.3 | 20,000 or more | 0.1 |
| Comparative Example 1 | 0.500 | 127 | 50 | 0.3 | 20,000 or more | 0 |
| Comparative Example 2 | 0.282 | 132 | 155 | 1.3 | 10,000 or more | 1.8 |

Exploitability in Industry

The plastic optical fibers and optical fiber cables of the present invention can be used as optical information communication media.

We claim:

1. A plastic optical fiber having a three-layer structure comprising a core, a cladding and a protective layer wherein the core material is polymethyl methacrylate and the cladding material is a copolymer composed of 20 to 45% by weight of long-chain fluoroalkyl methacrylate units represented by the following formula (1), 54 to 79% by weight of methyl methacrylate units, and 0.05 to 2% by weight of methacrylic acid units.

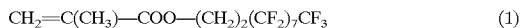 (1)

2. An optical fiber as claimed in claim 1 wherein the cladding material is a copolymer composed of 23 to 35% by weight of long-chain fluoroalkyl methacrylate units, 63 to 75% by weight of methyl methacrylate units, and 0.5 to 2% by weight of methacrylic acid units.

3. An optical fiber as claimed in claim 1 wherein the material of the protective layer is a copolymer composed of 70 to 90 mole % of vinylidene fluoride units and 30 to 10 mole % of tetrafluoroethylene units.

4. An optical fiber as claimed in claim 1 which has a core diameter of 0.5 to 1.5 mm and a numerical aperture of 0.24 to 0.40 and which exhibits a transmission bandwidth of 80 to 340 MHz when measured at a fiber length of 100 m and under full-mode launch conditions, and a transmission loss of not greater than 200 dB/km.

5. An optical fiber as claimed in claim 4 which has a numerical aperture of 0.27 to 0.34 and exhibits a transmission bandwidth of 90 to 250 MHz.

6. An optical fiber as claimed in claim 1 wherein, when the exit far field pattern of light emitted after 100 m propagation is measured under full-mode launch conditions, the ratio of the value obtained by integrating the far field pattern over an exit angle range of −20° to +20° to the value obtained by integrating the far field pattern over the full angle range is not less than 98%.

7. A plastic optical fiber cable having a four-layer structure comprising a core, a cladding, a protective layer and a jacket layer wherein said optical fiber cable is produced by covering an optical fiber as claimed in claim 1 with a jacket layer.

8. An optical fiber cable as claimed in claim 7 which has a core diameter of 0.5 to 1.5 mm and a numerical aperture of 0.24 to 0.40 and which exhibits a transmission bandwidth of 80 to 340 MHz when measured at a fiber length of 100 m and under full-mode launch conditions, a transmission loss of not greater than 200 dB/km, a transmission loss increment of not greater than 1 dB upon bending under 20 mm R/180° conditions, and a number of flexings to break of not less than 10,000 upon repeated flexing under 15 mm R/±90° conditions.

9. An optical fiber cable as claimed in claim 7 wherein, when the exiting far field pattern of light emitted after 100 m propagation is measured under full-mode launch conditions, the ratio of the value obtained by integrating the far field pattern over an exit angle range of −20° to +20° to the value obtained by integrating the for field pattern over the full angle range is not less than 98%.

10. An optical fiber cable having a four-layer structure comprising a core, a cladding, a protective layer and a jacket layer which has core diameter of 0.5 to 1.5 mm and a numerical aperture of 0.24 to 0.40 and which exhibits a transmission bandwidth of 80 to 340 MHz when measured at a fiber length of 100 m and under full-mode launch conditions, a transmission loss increment of not greater than 1 dB upon bending under 20 mm R/180° conditions, and a number of flexings to break of not less than 10,000 upon repeated flexing under 15 mm R/±90° conditions.

11. An optical fiber cable having a four-layer structure comprising a core, a cladding, a protective layer and a jacket layer wherein, when the exiting far field pattern of light emitted after 100 m propagation is measured under full-mode launch conditions, the ratio of the value obtained by integrating the far field pattern over an exit angle range of −20° to +20° to the value obtained by integrating the far field pattern over the full angle range is not less than 98%.

* * * * *